(12) United States Patent
Shaffer et al.

(10) Patent No.: US 6,411,601 B1
(45) Date of Patent: Jun. 25, 2002

(54) SYSTEM AND METHOD FOR SECURING AVAILABLE COMMUNICATIONS NETWORK RESOURCES

(75) Inventors: Shmuel Shaffer, Palo Alto; William J. Beyda, Cupertino, both of CA (US)

(73) Assignee: Siemens Information and Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/212,337

(22) Filed: Dec. 15, 1998

(51) Int. Cl.[7] .............................................. G01R 31/08
(52) U.S. Cl. ....................... 370/230; 370/352; 370/401; 370/468; 709/229
(58) Field of Search ................................ 709/227, 229; 370/230, 231, 232, 352, 353, 354, 355, 356, 400, 401, 465, 468

(56) References Cited

U.S. PATENT DOCUMENTS

| | | | | |
|---|---|---|---|---|
| 5,315,586 A | * | 5/1994 | Charvillat | 370/230 |
| 5,367,517 A | * | 11/1994 | Cidon et al. | 370/230 |
| 5,701,465 A | * | 12/1997 | Baugher et al. | 370/231 |
| 5,812,551 A | | 9/1998 | Tsukazoe et al. | 370/399 |
| 5,940,479 A | * | 8/1999 | Guy et al. | 370/522 |
| 6,205,484 B1 | * | 3/2001 | Eriksson | 709/229 |

FOREIGN PATENT DOCUMENTS

| | | | | |
|---|---|---|---|---|
| GB | 2 327 317 | 1/1999 | ............ | H04Q/3/00 |
| GB | 2 331 659 | 5/1999 | ............ | H04L/12/56 |
| JP | 11-308231 | 11/1999 | ............ | H04L/12/28 |
| WO | WO 96/04743 | 2/1996 | ............ | H04M/3/42 |

OTHER PUBLICATIONS

Copy of Search Report for GB Appln. No. 9929338.3; date search was completed: May 31, 2000.

* cited by examiner

Primary Examiner—Ricky Ngo

(57) ABSTRACT

A system and a method for securing telecommunications resources include a resource requirements module which determines network resource requirements specified in call requests of telecommunications calls. In one embodiment, a resource availability monitor determines if the resource requirements exceed the available levels for at least two network resources. In another embodiment, the resource availability monitor determines if Digital Signal Processor (DSP) requirements in the call request exceed DSP availability. If the resource requirements exceed the resource availability at the time when the call request is received, a resource reservation mechanism places the call request into network resource queues for those network resources which are in short supply. When the call request reaches the front of one of the network resource queues, the resource reservation mechanism reserves the network resource for a predetermined time interval and determines whether all resource requirements for the call request can be satisfied. If so, the call is established. If any resource requirements cannot be satisfied within the predetermined time interval, the reserved resources are released to provide the next call request in the queue the opportunity to reserve the network resources. If all resource requirements are satisfied, a call setup subsystem establishes the call.

20 Claims, 4 Drawing Sheets

SYSTEM AND METHOD FOR SECURING AVAILABLE COMMUNICATIONS NETWORK RESOURCES

BACKGROUND OF THE INVENTION

The invention relates to a system and a method for telecommunications and, more specifically, to a system and a method for securing network resources requested for completing a telecommunications call.

DESCRIPTION OF THE RELATED ART

A common concern in the telecommunications industry has been how to handle the situation in which a caller is unable to establish a connection to a called terminal, typically a telephone, because insufficient network resources are available to connect to the called terminal. For example, the called terminal might be a telephone which has a single line connecting the terminal to a central office. If a user of the called terminal is already on the line when a call is placed, the traditional approach has been to notify the calling party that the line to the called terminal is occupied by transmitting a busy signal to the terminal of the calling party.

A solution to the problem of a busy line is to employ a call waiting feature. A second call which is initiated when the called party is on the line with a first call causes the central office to transmit an audible signal, notifying the called party of the availability of the second call. If the called party triggers the appropriate signal to the central office, the called party's line is switched over to the second call. However, the called party can choose to disregard the notice of the second call. Both the busy signal transmission and the call waiting feature provide only partial caller satisfaction to the occupied line problem. If a caller encounters a busy signal, the caller has no way of knowing how long the called party will remain on the line with the first call. The caller might have to retry the call numerous times before the line becomes available. In the call waiting scenario, if the called party ignores a call waiting tone, the caller might not be able to determine that the called party is actually utilizing the called terminal. In this case, the caller will not even know to retry the call, because the caller will not be notified that the called party is located at the called terminal.

A camp-on feature enables a caller to instruct a switching device, such as a central office (CO) or a private branch exchange (PBX), to monitor the line to the called terminal to determine when the called terminal becomes available. Upon determining that the line to the called terminal is no longer occupied, the switching device places the call to the called terminal and notifies the caller that the call has been placed. In this manner, the call is placed as soon as the called terminal becomes available, without the caller having to manually replace the call.

If a call attempt is unsuccessful, it is possible that the call was rejected because insufficient network bandwidth is available to support the call. That is, the called terminal might be available, but insufficient bandwidth prevents the call from being established to the called terminal. U.S. Pat. No. 5,812,551 to Tsukazoe et al. describes a system which is capable of camp-on request registration specifically for network bandwidth. A terminal that has been issued a connection refusal transmits a camp-on request to an Asynchronous Transfer Mode (ATM) exchange. The ATM exchange monitors an "empty-band" value to determine bandwidth availability. When the empty-band value exceeds the band value required for the camp-on request, the ATM exchange establishes the connection.

Although the Tsukazoe et al. system works well for its intended purpose, further improvements are desired. A call attempt can be rejected for reasons other than an occupied line or insufficient bandwidth availability. What is needed is a system and a method for securing network resources in a manner which is responsive to the availability of multiple network resources required to complete a call.

SUMMARY OF THE INVENTION

A system and a method for securing necessary resources for establishing a call include a resource availability monitor which compares available levels of at least two network resources to requested levels of the network resources, as specified in a call setup signal. If insufficient network resources are available when the call request signal is received, a resource reservation mechanism requests reservation of the call-specified resources and a call setup subsystem automatically establishes the call when the available levels equal or exceed the required levels.

In a preferred embodiment, the invention is practiced in a voice-over-data-network environment. The system requests reservation of quantities of at least two network resources specified in the call request, monitors the available levels of the specified resources, reserves the resources as they become available, and when the requested levels of the network resources have been reserved, the call setup subsystem establishes the call. In this preferred embodiment, the network resources include Digital Signal Processor (DSP) resources, including transcoding DSP resources and conferencing DSP resources. The transcoding DSP resources are utilized, among other things, to perform conversion functions between terminals that utilize different compression algorithms. The conferencing DSP resources are utilized to mix simultaneously generated voice data within a conferencing call. The network resources further include trunking resources required to complete a call. For example, the system might include a gatekeeper that is connected to multiple trunks for supporting incoming and outgoing calls. The trunking resource requirements specified in a call request signal are compared to available trunking resources to determine whether reservation of trunking resources must be requested. Network bandwidth requirements are compared to network bandwidth availability and the availability of the called terminal is ascertained to determine whether reservation of network bandwidth or access to the called terminal must be requested.

In a preferred embodiment, after it is determined that the requested levels of the network resources are not available, the resource reservation mechanism forms a queue for the calls that require network resources which have availability levels which are below the requested quantities. For example, a conference call request might specify DSP requirements for a conferencing call which will include video teleconferencing to two called terminals. If network bandwidth requirements, trunking requirements, and called terminal access requirements exceed the availability levels for all three of these resources, the resource reservation mechanism places the call into queues for each of the resources. The call advances within the queues and, upon reaching the front of one of the queues, for example the network bandwidth queue, the resource reservation mechanism reserves the required bandwidth level for a predetermined time interval. If the call is not established within the predetermined time interval because, for example, sufficient DSP resources had not been secured within the time interval that started when the network bandwidth came available, the bandwidth is released to free up bandwidth for other calls.

The precise duration of the network interval can be calibrated to accommodate the competing interests of minimizing the waiting period that calls must endure before all the required resources for a call can be simultaneously reserved and of minimizing wasted resources which are tied up while the resources are reserved.

In one embodiment, the method is utilized to camp on to DSP resources only. The DSP requirements for a voice-over-data-network call are determined and compared to a level of available DSP resources. A reservation for the required DSP resources is requested if the required DSP resources exceed the available DSP resources, and the voice-over-data-network call is established when the level of available DSP resources meets the required quantities of DSP resources.

These and other embodiments are understood from the detailed description in conjunction with the drawings below.

DETAILED DESCRIPTION

Figure 1:
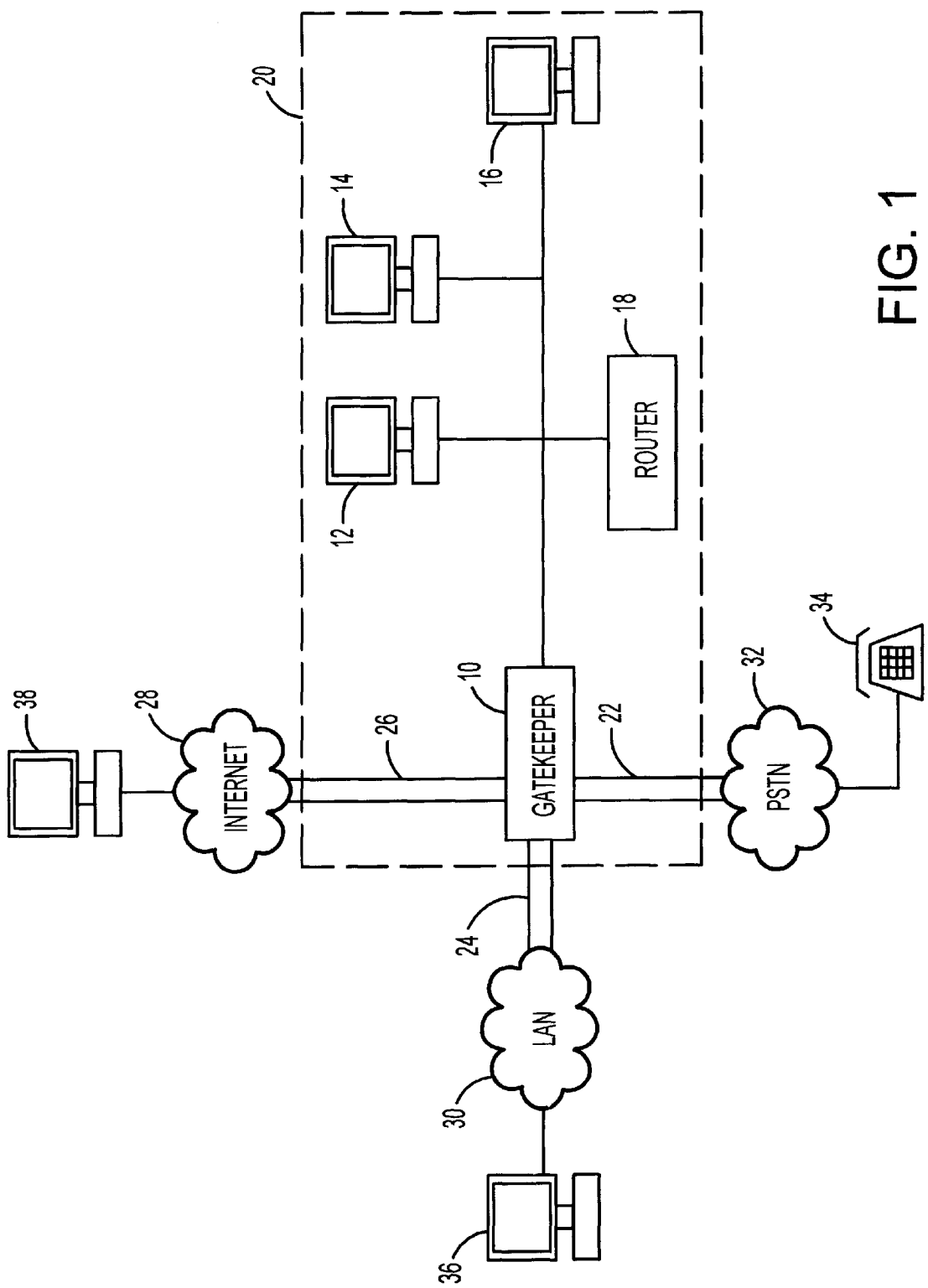
FIG. 1 is a block diagram of an exemplary telecommunications network environment in which the present invention operates.

With reference to FIG. 1, a gatekeeper 10 supports communication between first 12, second 14, and third 16 telephony-enabled computers located on a first Local Area Network (LAN) 20. The computers can be configured to support Internet Protocol (IP) telephony, but other known telephony-over-data-network technologies may be utilized. The gatekeeper 10 performs Digital Signal Processor (DSP) functions which include mixing voice data during conference calls and providing conversion functions for terminals which employ incompatible voice encoding algorithms. For example, a digital telephone 34 connected to a Public Switched Telephone Network (PSTN) 32 might employ a different voice compression algorithm than the first computer 12 on the first LAN 20. A router 18 directs voice data transmitted among the first 12, second 14, and third 16 computers, as well as voice data received from and transmitted to the digital telephone 34 located on the PSTN 32, a first remote computer 36 located on a remote LAN 30, and a second remote computer 38, located on the global communications network commonly referred to as the Internet 28.

The gatekeeper 10 also manages network resources during call setup procedures to enable a caller to camp on to network resources which were not available at required levels when the call is attempted. As an alternative, the network resource management functions can be performed by another centrally located network device, such as a call server (not shown).

Figure 2:
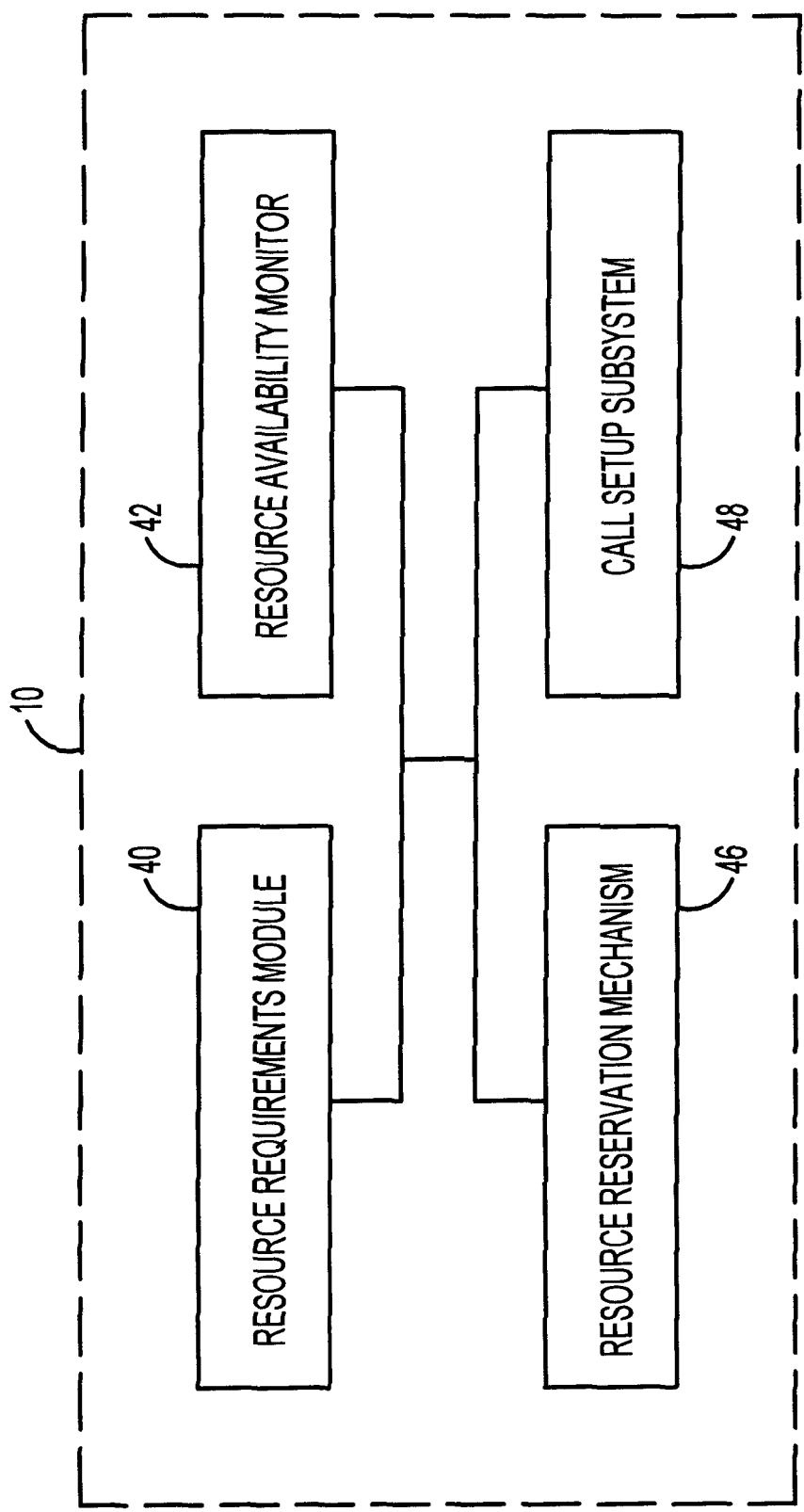
FIG. 2 is a high level block diagram of a system for reserving network resources according to the present invention.

With reference to FIGS. 1 and 2, the gatekeeper 10 includes a resource requirements module 40 that generally ascertains call requirements for calls, a resource availability module 42 that determines the availability of network resources and terminals, a resource reservation mechanism 46 that requests reservation of and manages network resources, and a call setup subsystem 48 that establishes calls, as described further below.

Resource requirements module 40 which ascertains call requirements for calls to and from the first LAN 20. The resource requirements module determines the call requirements of a call by analyzing the call request transmitted from the calling party. The call requirements include which terminals must be accessed for the call. If the call is a direct call to a single terminal, for example from the first remote computer 36 on the remote LAN 30 to the third computer 16 on the first LAN 20, the gatekeeper must only determine the availability of the third computer. If the call request is a conference call request for a conference call to first 12, second 14, and third 16 computers, the gatekeeper will determine the availability of each computer specified in the call request. The gatekeeper can also be configured to determine specifically which resources must be available to the called terminal to complete the call. For example, if the call request specifies a video teleconferencing call, each terminal must have available resources required to receive and transmit video streams.

The resource requirements module 40 also determines how much network bandwidth will be required to complete a requested call. A call from the second remote computer 38 through the Internet 28 to the first computer 12 on the first LAN 20 will require a specific bandwidth. Each call request provides the information which the resource requirements module utilizes to determine network bandwidth requirements for the call. For example, a voice-only call will require less network bandwidth than a video teleconferencing call. Furthermore, the resource requirements module 40 can determine bandwidth requirements for a remote network, such as the remote LAN 30, which are associated with an outgoing call. A video teleconferencing call from the first computer 12 to multiple computers (not shown) on the remote LAN 30 will place substantial bandwidth demands on the remote LAN.

In order to determine if sufficient DSP resources are available to complete calls, the resource requirements module 40 determines the DSP requirements for each call. As noted above, DSP resources include conferencing DSP resources and transcoding DSP resources. The conferencing DSP resource requirements are a function of how many called terminals are specified in a call request. A call to a single called terminal will require no conferencing DSP resources, because no voice mixing is required in a person-to-person call. As the number of called terminals within a conference call increases, the conferencing DSP resources increase.

Trunking resources controlled by the gatekeeper 10 can create a bottleneck which prevents a requested call from being established. For the purpose of simplicity, the gatekeeper is shown connected to only three trunk lines; a first trunk line 22 connects via a gateway functionality (not shown for simplicity, the gateway functionality may be embodied in the gatekeeper or may be embodied in a separate hardware gateway) to the PSTN 32, a second trunk line 24 connects to the remote LAN 30, and a third trunk line 26 connects to the Internet 28. The resource requirements module 40 determines the trunking resources required for a particular call based on the location(s) of the called terminal(s). If a conference call request from the second computer 14 specifies the first remote computer 36, the second remote computer 38, and the digital telephone 34 as called terminals, the trunking requirements for the call will include the first 22, second 24, and third 26 trunk lines.

A resource availability monitor 42 determines the availability of network resources specified in call requests. The resource requirements module 40 communicates to a resource availability monitor 42 information regarding which network resources are specified in a call request, so that the resource availability monitor only obtains relevant resource availability data for that call request. For example, if a call request specifies a person-to-person call, the level of conferencing DSP resources will not be monitored because the conferencing DSP resources are not required for the person-to-person call.

To determine network bandwidth availability on the first LAN 20, the resource availability monitor 42 communicates with the router 18 to obtain bandwidth availability data. In a preferred embodiment, the resource availability monitor 42 communicates with routers and other switching devices (not shown) on remote networks, such as the remote LAN 30, to determine network bandwidth availability on those networks. By obtaining remote network bandwidth availability data, the system is able to determine whether a call to one or more of the remote networks can be established and, if not, the system can camp on to network bandwidth on the remote network.

The resource availability monitor 42 determines availability of called terminals in order to ascertain whether the system will have to camp on before establishing connectivity to the called terminals. Additionally, the resource availability monitor preferably is configured to identify whether a called terminal has available resources required to support a call. For example, if the first remote computer 36 is running a video application when the video teleconferencing call request is made, the called terminal might not have sufficient available video processing resources to support the video teleconferencing call. The resource availability monitor 42 also preferably is able to obtain data from an electronic calendar on a called terminal. In this manner, the resource availability monitor is able to identify when the called terminal user will be available to take a call. This feature is especially applicable to a conference call situation. The resource availability monitor 42 can assemble the calendar data for the users of all the called terminals to provide the caller with a choice of times when the call can be made.

If a call is requested to a called terminal on a network other than the first LAN 20, the resource availability monitor 42 determines the availability of trunk lines to support the requested call. If a call to the first remote computer 36 is requested and the second trunk line 24 to the remote LAN 30 is fully occupied, the resource availability monitor determines that insufficient trunking resources are available to support the requested call.

As noted briefly above, the resource availability monitor 42 can determine the availability of both conferencing DSP resources and transcoding DSP resources. If the gatekeeper 10 is mixing voice data for numerous conference calls when a conference call request is received, the gatekeeper will have a relatively low level of DSP resources available to mix voice data for the requested conference call. Likewise, if the gatekeeper 10 is transcoding compression algorithms for numerous calls, there will be a relatively low level of transcoding DSP resources available.

Figure 3:
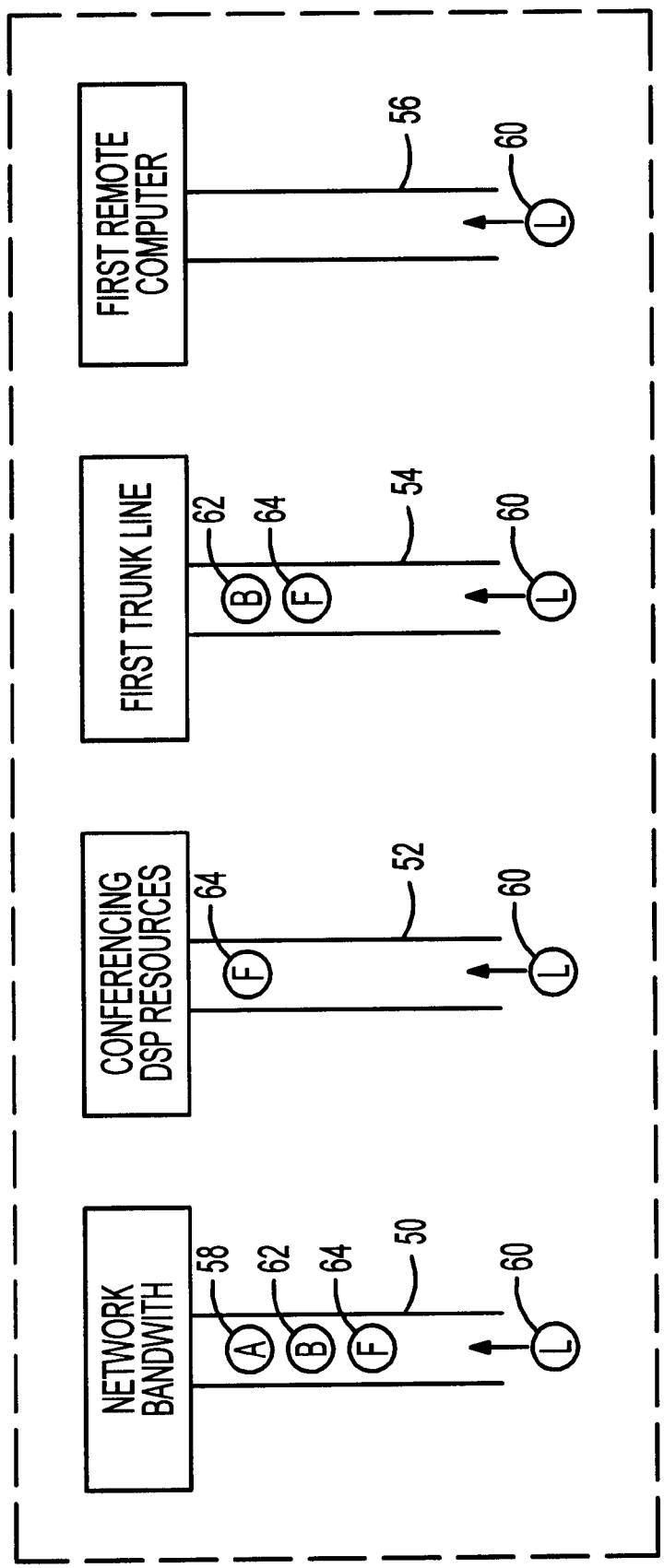
FIG. 3 is a schematic diagram of network resource reservation queues utilized by the system shown in FIG. 2.
Figure 4:
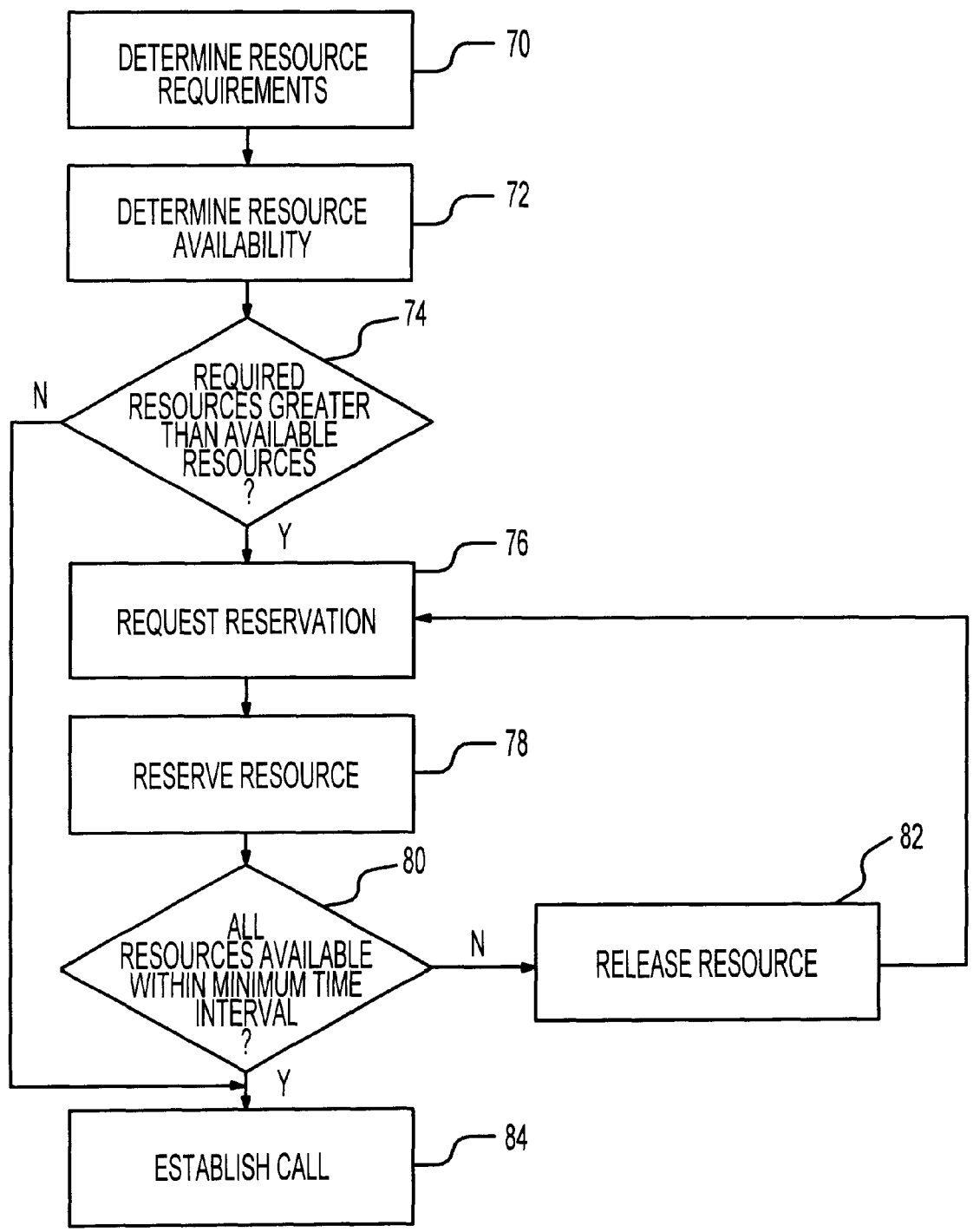
FIG. 4 is a process flow of a network resource reservation method performed by the system shown in FIG. 2.

When a call request specifies levels of network resources which are not available at the time the request is made, the system of the present invention enables a caller to camp on to those network resources which are below the requested levels. The caller is notified that the call cannot be placed and is provided with an option of camping on to the presently available resources. Upon receiving a camp-on request, a resource reservation mechanism 46 communicates with the resource availability monitor 42 to determine which network resources are below the requested levels. The resource reservation mechanism 46 then requests reservation of the network resources. Referring to FIGS. 1, 2 and 3, in a preferred embodiment, the resource reservation mechanism 46 manages several network resource queues, including a network bandwidth queue 50, a conferencing DSP resources queue 52, a first trunk line queue 54, and a first remote computer access queue 56. The set of queues shown in FIG. 3 is illustrative and is not a complete set of all possible queues. The queues shown are for those network resources which are unavailable at the levels specified in a conferencing call request L 60. Call request L is placed into the queues for the various network resources and is advanced as the call requests ahead in the queues are either executed or returned to the end of the queue.

If a call request is at the front of a resource queue and there is sufficient level of the network resource available to satisfy the call request, and the call request is not waiting behind other call requests in any other queue (i.e., the call is otherwise ready to be established), the call setup subsystem 48 establishes the call. For example, in FIG. 3 call A 58 is in the network bandwidth queue 50, but is in no other network resource queue. The requested network bandwidth is reserved for call A 58 and the call setup subsystem 48 establishes call A.

If, on the other hand, a call request is advanced to the front of a first queue but is awaiting advancement in another queue, the resource reservation mechanism 46 reserves the resource associated with the first queue for a predetermined time interval. If the requested call is not established within the predetermined time interval, the reserved resource is released and the call request is returned to a rearward position in the first queue. For example, call request F 64 is at the head of the conference DSP resource queue 52, so the resource reservation mechanism 46 reserves the requested conference DSP for the predetermined interval. However, call request F 64 is behind call request A 58 and call request B 62 in the network bandwidth queue 50, and is behind call request B in the first trunk line queue 54. If call request F 64 is not advanced to the front of the network bandwidth queue 50 and the first trunk line queue 54 before the predetermined time interval expires, the reserved DSP resources are released. The predetermined time interval can be calibrated to accommodate the competing interests of minimizing the hold time before a call request is executed and of minimizing waste of network resources which are idled while they are reserved.

It will be understood by those skilled in the art that the above-described system and the method to be described below can be practiced in any telecommunications environment (such as a PBX or CO) in which more than one network resource may be required to complete a call. The system and the method of the present invention enable a caller to camp on to resources that are unavailable at the time the call request is made.

Referring to FIGS. 1, 2, 3, and 4, a method for securing telecommunications resources includes the step 70 of determining resource requirements specified in a call request. The call requirements include, but are not limited to, availability of the called terminal, network bandwidth, resources available to the resource reservation mechanism to respond to a camp-on request, trunk line resources, and DSP resources, including conferencing DSP resources and transcoding DSP resources. In step 72, the resource availability monitor 42 determines the level of available network resources for those network resources specified in the call request. At decision step 74, the resource availability monitor determines whether the required level of any resources specified in the call request is above a corresponding availability level for the network resource. If the availability levels for all requested network resources are above their requested levels, the call setup subsystem 48 establishes the call in step 84.

If any of the requested network resource levels are above their corresponding availability levels, in step 76, the resource reservation mechanism 46 requests a reservation for those network resources in response to a user-generated camp-on request. In the preferred embodiment, the network resource reservation step 76 includes placing the call request into network resource queues for those network resources with availability levels below the requested levels. If a call request specifies network bandwidth and conference DSP resource levels above the availability levels for these resources, the resource reservation mechanism 46 places the call request into the network bandwidth queue 50 and the conferencing DSP resource queue 52. When the call request reaches the front of one of the network resources queues and the network resource availability level meets the requested level, the resource reservation mechanism 46 reserves that network resource for a predetermined time interval in step 78. In decision step 80, the resource reservation mechanism 46 determines whether all of the requested resources are available to establish the call. If the requested resources are all available, in step 84 the call setup subsystem establishes the call. If less than all of the required resources are available in the predetermined time interval, in step 82 the reserved network resources are released and the call request is moved rearwardly in the network resource queue to allow the next call request the opportunity to reserve the network resource. In calibrating the time interval, it is important to take into account that if the time interval is too long, network resources will be wasted while they idly await utilization. Conversely, if the time interval is too short, those call requests with substantial network resource requirements will be required to reside in the network reservation queues for excessive time intervals.

In an alternative embodiment, the resource reservation method is utilized to camp on to DSP resources only. The DSP resources can include conferencing DSP resources and/or transcoding DSP resources. The DSP requirements for a voice-over-data-network call are determined and compared to a level of available DSP resources. A reservation for the required DSP resources is requested if the required DSP resources exceed the available DSP resources, and the voice-over-data-network call is established when the level of available DSP resources meets the level of required DSP resources.

The invention represents an advancement over the prior art in that call requests which exceed availability levels for multiple network resources are provided with an automatic camp-on feature for each deficient network resource. The invention expands the conventional camp-on feature to accommodate the increasingly complex environment of telecommunications.

What is claimed is:

1. A system for securing resources for communications transmissions comprising:

a resource requirement module configured to determine specified quantities of communications resources requested in a call request for a first call;

a resource availability monitor cooperative with said resource requirement module, said resource availability monitor being configured to monitor available levels of at least two said communications resources for which specified quantities are requested in said call request for said first call;

a resource reservation mechanism in communication with said resource availability monitor, said resource reservation mechanism being configured to request reservation levels for said communications resources subsequent to a determination that said specified quantities of said communications resources requested in said call request are satisfied by availability levels for said communications resources, said resource reservation mechanism also being configured to reserve a quantity of a first communications resource for a predetermined time interval if at least one of said communications resources for which specified quantities are requested in said call request is unavailable; and a call setup subsystem operatively associated with said resource reservation mechanism and said resource availability monitor, said call setup subsystem being configured to establish said first call at least partially in response to a determination that availability levels for said communications resources have at least equaled said specified quantities of said communications resources.

2. The system of claim 1 wherein said resource availability monitor is configured to compare an available level of digital signal processor resources to a specified quantity of said digital signal processor resources for supporting said first call.

3. The system of claim 1 wherein said resource availability monitor is configured to determine availability of a called terminal and a level of available network bandwidth for establishing said first call.

4. The system of claim 1 wherein said resource availability monitor is configured to determine whether each called terminal specified in a conference call request is available and to calculate digital signal processing resource requirements specified in said conference call request.

5. The system of claim 1 wherein said resource availability monitor is configured to notify said resource reservation mechanism upon detecting an availability level for a first communications resource which at least equals said specified quantity of said first communications resource, said resource reservation mechanism being configured to reserve said quantity of said first communications resource for said predetermined time interval in response to said notification and to release said reserved quantity of said first communications resource if said call setup subsystem has not established said first call prior to expiration of said predetermined time interval.

6. The system of claim 5 wherein said resource reservation mechanism is configured to form a queue of call requests for each resource having an availability level which is insufficient to satisfy said call requests.

7. The system of claim 6 wherein a call request is assigned a highest priority for only said predetermined time interval.

8. The system of claim 1 wherein said resource availability monitor, said resource reservation mechanism, and said call setup subsystem operate in a voice-over-data-network environment.

9. The system of claim 1 wherein said resource reservation mechanism is activated by a user-generated camp-on request, said resource availability monitor being configured to reject said camp-on request if insufficient processing resources are available to said resource reservation mechanism to handle said camp-on request.

10. A method for reserving multiple resources specified in a call request signal comprising the steps of:

determining quantities of network resources specified in said call request signal;

requesting reservation of quantities of at least two required network resources specified in said call request signal in response to a user generated camp-on request, said reservation of quantities being requested subsequent to determining that said quantities of said network resources are unavailable when said call request signal is received; and automatically establishing a call specified in said call request signal after determining that available quantities of said network resources have increased to at least equal said quantities of said network resources specified in said call request signal.

11. The method of claim 10 further comprising the steps of:

reserving a first quantity of a first network resource after an available quantity of said first resource has increased to at least equal a requested quantity of said first required resource; and releasing said first quantity of said first resource if said establishing step does not occur within a predetermined time interval after a start of said reserving step.

12. The method of claim 11 wherein said step of requesting reservation of said quantities of said network resources includes placing said call into a queue for said first resource, said step of releasing said first quantity of said first required resource including returning said call to a lower priority position in said queue.

13. The method of claim 10 wherein said requesting step includes requesting reservation of a network bandwidth level for said call if insufficient bandwidth is determined to be available and requesting reservation for access to a called terminal if said terminal is determined to be presently unavailable.

14. The method of claim 10 wherein said requesting step is a step of requesting access to more than two terminals for a conference call and requesting digital signal processing (DSP) resources for said conference call, said establishing step including establishing said conference call upon determining that said terminals and said requested DSP resources have become available.

15. The method of claim 14 wherein said requesting step further includes requesting a first quantity of trunking resources to support said conference call.

16. A method for securing resources for establishing a call in a voice-over-data-network environment comprising the steps of:

determining digital signal processor (DSP) resource requirements for a voice-over-data-network call;

comparing said DSP resource requirements to a level of DSP resources available to establish said call;

requesting reservation of a quantity of said DSP resources if said DSP resource requirements are greater than said available level of DSP resources;

monitoring said DSP resource availability level to determine when said available level of DSP resources is sufficient to support said DSP resource requirements; and automatically establishing said voice-over-data-network call upon determining that said available level of DSP resources is sufficient to support said DSP resource requirements.

17. The method of claim 16 further comprising the step of determining whether a called terminal is available for said voice-over-data-network call, said establishing step including establishing said voice-over-data-network call upon determining that said called terminal is available.

18. The method of claim 16 further comprising the steps of reserving a quantity of DSP resources upon determining that said available level of DSP resources is below said DSP resource requirements and releasing said reserved quantity of DSP resources if said voice-over-data-network call is not established within a predetermined time interval after said DSP resources are reserved.

19. The method of claim 18 wherein said step of reserving said quantity of DSP resources includes placing said voice-over-data-network call into a DSP resource queue.

20. The method of claim 16 further comprising the step of reserving network bandwidth in response to a determination that network bandwidth requirements of said voice-over-data-network call exceed network bandwidth availability, said establishing step including establishing said voice-over-data-network call when said network bandwidth availability equals said network bandwidth requirements.

\* \* \* \* \*